United States Patent [19]
Darling

[11] 3,973,657
[45] Aug. 10, 1976

[54] VARIABLE SPEED FAN FOR HEAT EXCHANGERS

[75] Inventor: Raymond A. Darling, Tulsa, Okla.

[73] Assignee: The Mott Company, Houston, Tex. ; a part interest

[22] Filed: Aug. 5, 1974

[21] Appl. No.: 494,568

[52] U.S. Cl. .............................. 192/58 R; 192/82 T; 192/113 B
[51] Int. Cl.² ......................................... F16D 31/00
[58] Field of Search .............. 192/58 R, 58 A, 58 B, 192/58 C, 59, 60, 61, 82 T, 113 B

[56] References Cited
UNITED STATES PATENTS

| | | | |
|---|---|---|---|
| 1,883,685 | 10/1932 | Gasterstadt | 192/61 |
| 1,935,400 | 11/1933 | Junkers | 192/61 |
| 2,559,358 | 7/1951 | Hullhorst et al. | 192/61 X |
| 2,633,216 | 3/1953 | Zak | 192/58 R |
| 3,020,992 | 2/1962 | Gunn | 192/61 |
| 3,208,570 | 9/1965 | Aschauer | 192/58 R |
| 3,458,020 | 7/1969 | Lutz | 192/58 B |
| 3,809,197 | 5/1974 | Clancey | 192/58 B |

FOREIGN PATENTS OR APPLICATIONS

| | | | |
|---|---|---|---|
| 940,935 | 11/1963 | United Kingdom | 192/60 |
| 876,609 | 9/1961 | United Kingdom | 192/61 |

Primary Examiner—Allan D. Herrmann
Attorney, Agent, or Firm—Head, Johnson & Chafin

[57] ABSTRACT

A variable speed fan for heat exchangers comprising a variable speed torque transmitting coupling interposed between a constant speed drive shaft and a fan for varying the speed of the fan in an air cooled heat exchanger having a constant speed drive for input torque. Torque is applied at a constant speed from the drive shaft of a suitable power source to a pump disposed in a fluid reservoir contained in a housing supported on the drive shaft. The reservoir housing is journalled on the drive shaft and rotatably supports the fan thereon. The pump is rigidly secured to the reservoir housing and as the rotor of the pump is rotated by the drive shaft, fluid is pulled into the pump and discharged therefrom through a suitable variable orifice valve for being recirculated to the fluid reservoir. When the variable valve is fully closed the pump functions as a rigid coupling between the drive shaft and the reservoir housing due to the static pressure built up in the hydraulic fluid, thus transmitting torque from the drive shaft to the housing, which then rotates simultaneously with the drive shaft for rotating the fan at the same speed as the speed of rotation of the drive shaft. The rotating speed of the fan is varied from the full speed of the drive shaft to substantially zero revolutions per minute by varying the opening of the orifice in the variable valve from fully closed to fully open.

13 Claims, 1 Drawing Figure

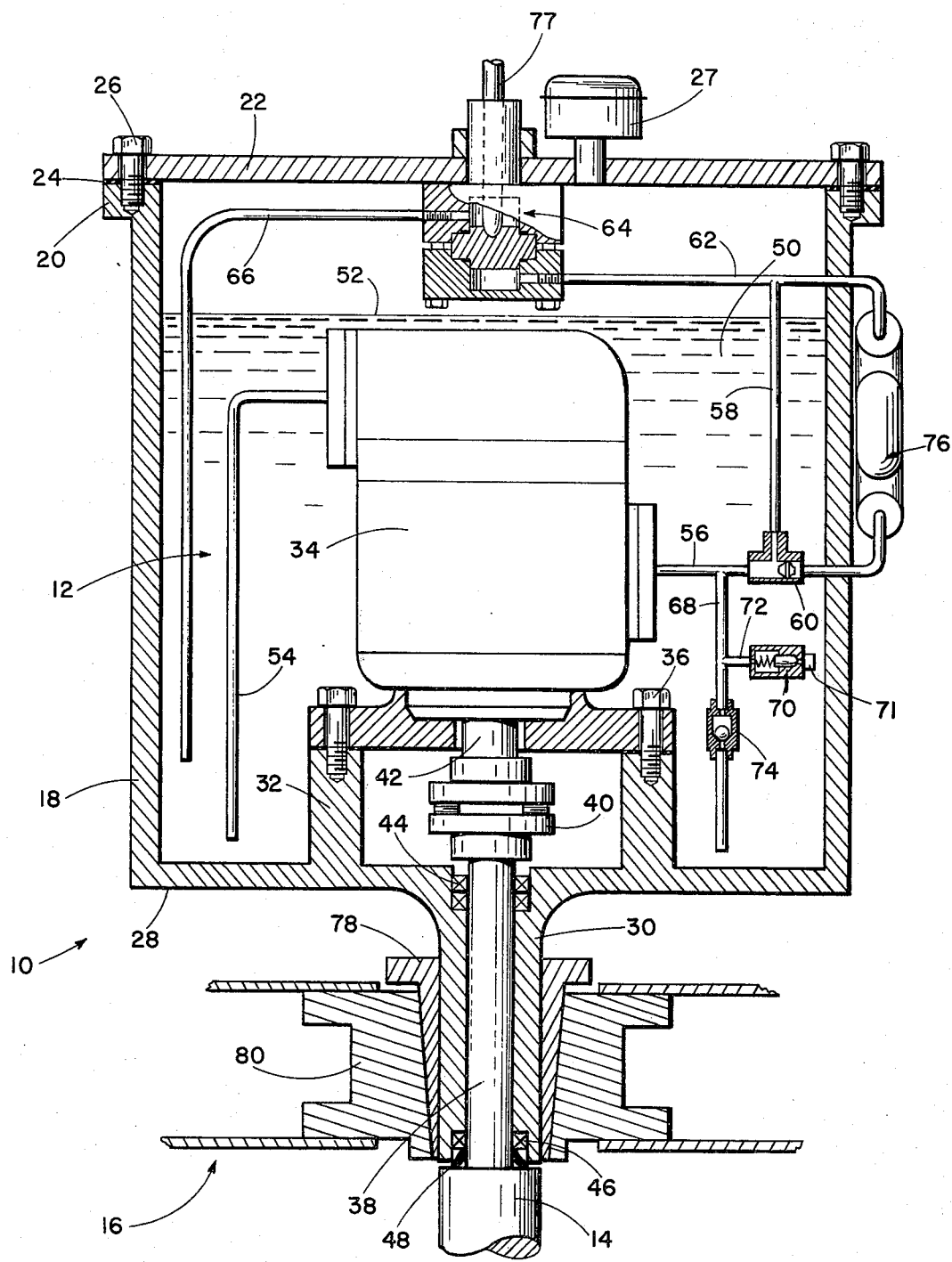

VARIABLE SPEED FAN FOR HEAT EXCHANGERS

CROSS-REFERENCE TO RELATED APPLICATION

This application is related to Patent Disclosure Document No. 024050, filed Oct. 25, 1973.

BACKGROUND OF THE INVENTION

1. Field of the Invention

This invention relates to improvements in variable speed torque transmitting coupling devices and more particularly, but not by way of limitation, to a variable fan for air cooled heat exchangers.

2. Description of the Prior Art

The usual presently available air cooled heat exchangers comprise a relatively large fan, for example a fan having blades which inscribe a 12 foot diameter circle, for moving air of ambient temperature across the heat exchanger coils, or the like. Most of the industrial type air cooled heat exchangers are designed to perform at the full load conditions, or at least near the full load conditions required for the highest ambient temperature that will occur during the hottest days of the year wherein the apparatus is to be utilized. As a consequence, the users of this type equipment in the southern gulf coast areas of this country normally specify equipment design for ambient temperatures of 95° F., and 100° F. in the broad middle band of the country, and 95° F. in the northern parts of the country. When a particular design specification or criteria has been set, the only thought given to the flow of air passing through the exchanger bundle is to restrict the air flow to accomplish temperature control on the tube side of the exchanger. This control is to prevent over cooling when the ambient or air temperature is less than that for which the heat exchanger is designed. As a consequence, the heat exchanger fan, which normally is in operation 24 hours a day and 7 days a week, runs at full capacity continuously, regardless of the air temperature, thus expending optimum horsepower, which results in a great waste of energy.

A study has been made of the air temperature patterns at 25 locations in the United States, and as a result of these studies, it has been ascertained that ambient temperatures are much less than the anticipated maximum temperatures a large percentage of the time, and the heat exchanger fans may be operated at greatly reduced speeds a substantial amount of the operating time of the heat exchangers without reducing the cooling efficiency, thus conserving great quantities of energy.

SUMMARY OF THE INVENTION

In order to ascertain the actual air temperature or weather conditions which are normally encountered in which heat exchangers are utilized, a study was made of air temperature patterns at twenty five locations in the United States, with the chief reference being *Climatolograph of the United States No. 82 — Decennial Census of United States Climate — Summary of Hourly Observations*, U. S. Department of Commerce, Weather Bureau 1962–1963. Table I lists these cities, showing the annular percentage of the time the temperature is less than 70°F.

Table I

| Per Cent of Annual Time When the Temperature is 69°F or Less | |
|---|---|
| Great Falls, Montana | 88% |

Table I-continued

| Per Cent of Annual Time When the Temperature is 69°F or Less | |
|---|---|
| Seattle, Washington | 95% |
| San Francisco, California | 95% |
| Los Angeles, California | 84% |
| Boise, Idaho | 82% |
| Casper, Wyoming | 85% |
| Reno, Nevada | 83% |
| Denver, Colorado | 81% |
| Pheonix, Arizona | 47% |
| Bismarck, North Dakota | 85% |
| Minneapolis, Minnesota | 82% |
| Omaha, Nebraska | 74% |
| Little Rock, Arkansas | 60% |
| Midland, Texas | 59% |
| New Orleans, Louisiana | 46% |
| Green Bay, Wisconsin | 88% |
| Grand Rapids, Michigan | 82% |
| Detroit, Michigan | 80% |
| Chicago, Illinois | 80% |
| Nashville, Tennessee | 65% |
| Burlington, Vermont | 86% |
| Philadelphia, Pennsylvania | 74% |
| Charleston, West Virginia | 74% |
| Atlanta, Georgia | 62% |
| Miami, Florida | 20% |

In view of the information enumerated in Table 1, it was determined that the maximum temperature for which air cooled heat exchangers are designed actually occurs a relatively small per cent of the time, and thus, the fans of these units are over-operating most of the time. Accordingly, a variable speed torque transmitting coupling for varying the speed of the fan in an air cooled heat exchanger in accordance with the air or ambient temperature was developed comprising a fluid reservoir housing journalled on the drive shaft of a power source for free rotation with respect thereto. A fan is carried by the housing and is rotatable simultaneously therewith. A pump is disposed in the fluid reservoir and rigidly secured to the housing for simultaneous movement therebetween. The pump is also a driving connection with the drive shaft of the power source for actuation thereby. The pump intake pulls fluid into the pump from the fluid reservoir, and discharges the fluid back into the fluid reservoir for a recirculation of the fluid during operation of the pump. A variable orifice valve is interposed in the discharge line of the pump, and when the orifice of the valve is completely closed, it will be readily apparent that no fluid can be recycled into the fluid reservoir, and a hydraulic lock is provided which locks the pump and the housing to the drive shaft. In this condition, the housing is rotated simultaneously with the drive shaft and at the same rotational speed thereof for causing the fan to rotate at the speed of the drive shaft. When the orifice of the valve is fully open, the fluid is freely recirculated through the pump with substantially no restriction, and there is little or no movement transmitted to the pump and housing. In this condition, the drive shaft rotates freely with respect to the housing during operation of the pump, and there will be little or no rotation of the fan. It will be apparent that incremental differences of the size of the orifice of the valve between the fully opened and fully closed position thereof will vary the speed of rotation of the housing, and thus vary the speed of rotation of the fan.

Table 2 shows the air temperature range of three cities in degrees Fahrenheit indicating annual time percentages in which the temperature ranges occur.

Table 2

| Air Temp. Range °F. | Per Cent of Time - Annual | | |
|---|---|---|---|
| | Miami | Litle Rock | Detroit |
| 100 – 95 | 0.02 | 1.22 | 0.01 |
| 90 – 95 | 1.42 | 3.57 | 0.54 |
| 85 – 90 | 10.13 | 5.76 | 1.69 |
| 80 – 85 | 20.47 | 7.93 | 3.58 |
| 75 – 80 | 28.09 | 10.8 | 5.88 |
| 70 – 75 | 19.48 | 10.72 | 8.22 |
| 65 – 70 | 9.24 | 9.16 | 8.93 |
| 60 – 65 | 5.15 | 8.3 | 7.93 |
| 50 – 60 | 4.84 | 14.93 | 13.97 |
| Below 50 | 1.16 | 27.33 | 49.16 |

On the basis of the information contained in Table 2 the average horsepower required for each of the 5 ° temperature segments down to 60°F was calculated, and an average was calculated for the 10° segment between 50°F and 60°F and below 50°F. For the purpose of comparison the horsepower per year required using an air cooled heat exchanger provided with a variable speed fan of the invention was contrasted with that required for use in the same cities with conventional single speed fan drives. From the calculations it has been concluded that on a given air cooled exchanger the effect of lowering the air temperature below peak ambient design on the fan horsepower requirement is dramatic. The energy saved in both money and natural resources is highly desirable adjunct to the industrial air cooled heat exchanger as it is being built and applied today.

BRIEF DESCRIPTION OF THE DRAWINGS

The single view is a sectional elevation view of a variable speed fan embodying the invention.

DESCRIPTION OF THE PREFERRED EMBODIMENT

Referring to the drawings in detail, reference character 10 generally indicates a variable speed fan comprising a torque transmitting coupling 12 interposed between a drive shaft 14 and a fan 16 for transmitting rotation to the fan 16. The drive shaft 14 is operably connected to any suitable power source (not shown) for rotation thereby in any well known manner (not shown). The torque transmitting coupling 12 comprises a housing 18 having an outwardly directed flange 20 provided at one end thereof for receiving a removable cover plate 22 thereon. A suitable sealing gasket 24 is preferably interposed between the plate 22 and the flange 20 for precluding leakage of fluid therebetween, and the plate 22 may be secured to the flange 20 in any suitable manner, such as by a plurality of bolts 26. A suitable breather filler cap 27 is secured to the cover 22 in any suitable manner and is in communication with the interior of the housing 18. The opposite end of the housing 18 is closed by a wall 28 having a centrally disposed axially outwardly extending sleeve 30 provided thereon. An inwardly directed sleeve 32 is provided on the inner surface of the wall 28 concentric with the sleeve 30 and a suitable positive displacement pump 34 is rigidly secured to the sleeve 32 in any suitable manner, such as by a plurality of spaced bolts 36. Of course, it will be apparent that a plurality of mutually parallel inwardly directed posts (not shown) may be provided in lieu of the sleeve 32 for supporting the pump 34, if desired.

The drive shaft 14 is preferably reduced at 38 and extends longitudinally through the sleeve 30 for connection with a suitable coupling 40 which is disposed in the sleeve 32, and which is operably connected with the input shaft 42 of the pump 34 in any well known manner. The sleeve 30 is freely journalled on the shaft portion 38 by suitable spaced bearings 44 and 46 and a suitable dynamic sealing means 48 is interposed between the drive shaft portion 38 and the sleeve 30 for precluding leakage of fluid therebetween.

A suitable fluid 50, such as oil, is maintained in the housing 18 to provide a fluid reservoir therein and is preferably maintained at a level therein as indicated at 52 whereby the pump 34 is submersed within the fluid. However, the reservoir 50 is filled to any suitable level which may be determined by considering that the larger the volume of fluid or oil, the greater the heat dissipating capacities thereof; the weight should be maintained at a minimum; and since the reservoir 50 is vented to the atmosphere through the breather filler cap 27, the oil level at maximum RPM of the fan 16 should never reach the breather filler cap 27.

A suitable conduit or suction line 54 has one end open to the fluid reservoir 50 and the opposite end in communication with the intake port (not shown) of the pump 34 whereby the fluid from the reservoir 50 will be drawn into the pump 34 upon actuation thereof, as is well known. The discharge or outlet port (not shown) of the pump 34 is in communication with a discharge conduit 56 which is in communication with a line 58 through a suitable temperature controlled valve 60, said line 58 being in open communication with a line 62 communication with one side of a suitable variable orifice valve 64. The opposite side of the valve 64 is in communication with the fluid reservoir 50 through a suitable conduit 66 for a purpose as will be hereinafter set forth.

A by-pass conduit 68 is preferably interposed in the line 56 between the valve 60 and the discharge port of the pump 34 and is in communication with a suitable normally closed valve 70 through a branch line 72. In addition, the line 68 is in communication with the fluid reservoir 50 through a suitable check valve 74 which is normally closed, and permits back flow of fluid through the line 68 under certain conditions as will be hereinafter set forth. The valve 70 is also in communication with the fluid reservoir 50 in any suitable manner such as a conduit 71.

The temperature sensitive or temperature controlled valve 60 is also open to suitable heat exchanger coils 76, or the like, which are preferable installed exteriorly of the housing 18 in any well known manner (not shown). The heat exchanger coils or section 76 is also in communication with the line 62 as clearly shown in the drawing. In the event fluid being discharged from the pump 34 becomes heated to such an extent that the overall operation of the apparatus 10 may be impaired, the flow of the fluid from the pump 34 to the variable orifice valve 64 may be diverted from the line 58 to the heat exchanger section 76 for reducing the temperature thereof. Alternately, of course, in the event the fluid becomes too cool for the efficient operation of the apparatus 10, the fluid may be diverted for passage through the heat exchanger section 76 for heating thereof, as desired.

The valve 64 may be of any suitable type wherein the flow of fluid therethrough may be varied, and is preferably provided with the usual valve stem 77 which may be manipulated exteriorly of the valve for varying of the fluid orifice (not shown) of the valve 64. It is preferable that the valve stem 77 be manipulated by an automatic temperature sensitive device (not shown) of any well know type whereby the opening of the valve 64 may be varied in accordance with the ambient temperature for a purpose as will be hereinafter set forth.

The sleeve 30 of the housing 18 may be installed on the usual fan 16 which is normally in operation on a heat exchanger (not shown) wherein the apparatus 10 is to be utilized, or may be provided with a fan 16 for installation on the heat exchanger (not shown) in lieu of the fan already provided thereon. A suitable flanged sleeve 78 may be disposed around the outer periphery of the sleeve 30 and rigidly secured thereto in any suitable manner, such as by complementary key and spline members (not shown). The outer periphery of the flanged sleeve 78 is provided with a longitudinally tapered outer periphery complementary to the tapered inner periphery a suitable hub member 80 such as normally provided on the usual fan 16. In this manner, the housing 18 may be easily installed in connection with the fan 16 and wedged securely thereto whereby simultaneous rotation will be provided between the housing 18 and the fan 16 as will be hereinafter set forth.

In operation, torque is applied at constant speed from the drive shaft 14 through the coupling 40 to the shaft 42 of the pump 34. Of course, the shaft 42 turns the rotor (not shown) of the pump 34 in the usual manner whereby suction is created at the intake port (not shown) for pulling fluid from the reservoir 50, through the line 54, and into the pumping chamber (not shown) of the pump, and for discharging fluid from the discharge port (not shown) into the discharge line 56. The discharging fluid is normally directed through the lines 56, 58 and 62 into the variable orifice valve 64, through the valve 64, and out the discharge line 66 for recirculation of the fluid to and from the reservoir 50. When the orifice valve 64 is fully opened, the fluid will be recirculated with substantially no resistance, and the housing 18 will remain substantially stationary, regardless of the speed of rotation to the drive shaft 14. When the valve 64 is fully closed, the fluid will be trapped in the lines 62, 58, 56 and pumping chamber, and as the rotor of the pump 34 continues to rotation due to the driving connection with the drive shaft 14, the hydraulic "lock" in the pump will cause the pump 34 itself to rotate with respect to the body of fluid therein. Of course, rotation of the pump itself will be transmitted to the housing 18 through the rigid connection 36 between the pump 34 and the housing 18. Since the fan 16 is rigidly connected with the sleeve 30, the fan 16 will be simultaneously with the housing 18, and at the same speed of rotation thereof regardless of the speed of rotation of the drive shaft 14.

Of course, variable rotational speed will be transmitted to the fan 16 through the housing 18, depending upon the degree of opening of the orifice valve 64 between the fully open and fully closed positions thereof. It is preferable that the degree of opening of the valve 64 be dependent upon the ambient temperature upon which the valve stem 77 relies for actuation of the variable orifice portion (not shown) of the valve 64. For example, under high ambient temperatures, it is preferable that the orifice of the valve 64 be greatly restricted in order that the speed of rotation of the fan 16 will be as great as possible for moving a maximum quantity of air across the heat exchanger. Conversely, when the ambient temperature is low, it is preferable that the orifice of the valve 64 be less restricted in order that the speed of rotation of the fan 16 will be lessened since it will not require as great a quantity of air moving across or through the heat exchanger for an efficient operation thereof during relatively low ambient temperature conditions.

It is preferable that the variable orifice valve 64 be mounted on the cover 22 in substantial axial alignment with the shaft 14 to facilitating the use of an external means (not shown) of manipulating the valve stem 77 for varying the orifice of the valve. In addition, the manipulation of the stem 77 may be accomplished either automatically or manually, as desired, and through the use of many suitable and readily available devices (not shown) for this purpose.

In the event the fan 16 has been idle, and the valve 64 closed, and torque is suddenly applied to the drive shaft 14, such as by actuation of the power source of the shaft 14, an immediate surge of static pressure might build up in the line 56, and the pressure might exceed the safe working pressure of the pump 34 and other components of the apparatus 10. In order to prevent this, the relief valve 70 will open to relieve "over-pressure" and allow the fan to slowly or gradually be accelerated to the normal full speed operation. Of course, ideally, the apparatus 10 should always be shut down with the valve 64 fully open, thus permitting the power source to start up under no load conditions, and eliminating the power surge required to accelerate a full load to start-up.

In the event power is instantaneously removed from the drive shaft 14 while the fan 16 is operating at maximum revolutions per minute. The inertia of the fan may cause it to continue to rotate and coast to a stop while its inertia is being dissipated. This action would have the effect of causing the rotor of the pump 34 to reverse its rotation and thereby reversing the fluid flow within the pump 34, taking suction through line 56 and discharging it through line 54. Since the fan 16 is rotating at full speed at the time of the loss of power, the valve 64 will be fully closed. In order to prevent the pump 34 from pulling against a closed suction line and causing possible damage, the check valve 74 will open for providing communication between the line 56 and the fluid reservoir 50.

It is to be understood that, in any position of the orifice valve 64 other than fully open, a certain amount of heat will be generated or built up in the fluid due to slippage of the fluid or oil within the positive displacement pump 34. Ideally, the fan 16 will always be running or rotating at a relatively low RPM such as when the ambient temperature is low, thereby placing very little back pressure on the pump for minimum slippage. Under these conditions, the heat generated in the system will be dissipated through the body of the fluid reservoir. However, since the apparatus 10 is intended to be utilized in order to provide temperature control for air cooled exchangers, as well as a power saving device, it must be assumed that the speed of the fan 16 will be varied through its entire operational range in accordance with the ambient temperature in which it may be operating. Thus, the possibility exists that the internal slippage of the pump 34 will build up sufficient heat in the fluid or oil to cause damage both to the fluid and the other components of the system. In order to prevent this, the temperature responsive valve 60 and heat exchanger section 76 have been provided. As hereinbefore set forth, when the temperature of the fluid reaches a predetermined level, the valve 60 automatically diverts the flow of the fluid from the line 58 to the heat exchange section 76 for a cooling thereof before directing the fluid to the line 62. The cooler or heat exchanger section 76 may be of any suitable type, and preferably consists of finned tubing (not shown) encircling the reservoir a number of times as required, and it may be preferable that the reservoir per se may be constructed with cooling fins on the exterior thereof, if desired. Of course, it will be apparent that the automatic operation of the valve 60 controls the temperature of the fluid for preventing over-cooling at low ambient temperatures and over-heating under adverse conditions.

One problem of hydraulic power transmission devices is to adequately seal the system to prevent the loss of the fluid around rotating shafts, and the like. As the pressure of the fluid in the system is increased, the sealing problem becomes more acute. In the present invention, the fluid is carried at atmospheric pressure, with only the weight of the fluid or oil having to be sealed around the shaft 14 for leakage. The dynamic seal 48 efficiently seals between the shaft 14 and the inner periphery of the sleeve 30, but at the same time permits the fluid to constantly lubricate the bearings 46.

It is preferable that the pump 34 be a high pressure pump in order to reduce the size and weight thereof. In presently available equipment of this type, high pressure pumps have been avoided because of the shaft seal problem. However, the sealing problem is minimized in the apparatus 10 by encapsulating the pump within the fluid reservoir. In addition the pump 34 will be required to operate at maximum pressure for only a fraction of the time since maximum operating is necessary only when ambient temperatures are sufficiently high as to call for maximum RPM of the fan 16. Since the weather studies of normal ambient temperatures has indicated that the highest temperatures occur only a very small percentage of the time, the pump 34 will be operating at something less than maximum pressure for a great percentage of the time.

Whereas the particular embodiment of the invention disclosed herein describes a drive shaft operably connected with the pump means for activation thereof, and said pump means rigidly secured to the housing means for transmitting variable speed rotation thereto independently of the drive shaft, it will be apparent that the operation of the apparatus may be reversed. Suitable pulley means (not shown) may be operably secured to the housing means for transmitting rotation to the housing and pump, said pump means subsequently transmitting rotation to the drive shaft. Of course, in this reversed embodiment, it may be desirable that the pulley means be suitably connected between the housing means and the power source for providing constant speed of rotation for the housing means, and the drive shaft may be operably secured to the fan for transmitting variable speed rotation thereto in the same general manner as hereinbefore set forth.

From the foregoing, it will be apparent that the present invention provides a novel variable speed fan for air cooled heat exchangers comprising a variable speed torque transmitting coupling interposed between a constant speed drive shaft and a fan or impeller. The apparatus comprises a housing freely journalled on the drive shaft for independent rotation with respect thereto and rigidly connected with the fan for simultaneous rotation therebetween. A pump is disposed within a fluid reservoir provided within the housing and operably connected with the drive shaft for operation thereby to recycle or recirculate the fluid in the fluid reservoir through a temperature responsive variable orifice valve. In addition, the pump is rigidly secured to the housing whereby the pump and housing may rotate simultaneously. Under high ambient temperature conditions, the variable orifice valve will be substantially closed, creating a hydraulic lock condition within the pump which results in rotation of the pump with respect to the drive shaft. Of course, the housing will rotate simultaneously with the pump, thus transmitting rotation to the fan. In the fully closed position of the valve, the fan will be rotated at a speed substantially equal to the rotational speed of the drive shaft. Under low ambient temperature conditions the variable orifice valve will be substantially fully opened, thus permitting a substantially free circulation of the fluid through the pump and back into the fluid reservoir. In this condition, the pump and housing will remain substantially stationary, and the fan will be substantially at rest. Of course, varying positions of the variable orifice valve between the fully open and fully closed positions thereof will result in variable rotational speeds for the fan, regardless of the speed of the constant speed drive shaft. The novel apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A variable speed fan for an air cooled heat exchanger having a constant speed drive shaft and comprising a variable speed torque coupling interposed between the drive shaft and the fan, said torque coupling comprising housing means freely journalled on the drive shaft for independent rotation therebetween and operably connected with the fan for rotation simultaneously therewith, a fluid reservoir provided in the housing means, a pump rigidly secured to the housing for movement simultaneously therewith and in communication with the fluid reservoir for recirculating the fluid therein, means operably connecting the pump with the drive shaft for actuation of the pump, variable orifice valve means in communication with the pump for receiving the fluid therethrough during recirculation of the fluid, said variable orifice valve being selectively operable between fully open and fully closed for controlling the recirculation of the fluid whereby speed of rotation of the pump and housing means and fan may be selectively varied between a minimum rotational speed of zero and a maximum rotational speed equal to the speed of the drive shaft.

2. A variable speed fan as set forth in claim 1 and including a heat exchanger section in communication with the pump means and variable orifice valve means, and heat controlled valve means interposed between the pump and variable orifice valve means for diverting the flow of fluid through the heat exchanger section upon high temperature fluid conditions in the fluid reservoir.

3. A variable speed fan as set forth in claim 1 and including dynamic seal means interposed between the drive shaft and housing means for precluding leakage of fluid therebetween.

4. A variable speed fan as set forth in claim 1 wherein the pump is a positive displacement pump.

5. A variable speed fan as set forth in claim 1 wherein the variable orifice valve means is a temperature sensitive valve wherein the orifice is fully closed under relatively high ambient temperature conditions and fully open under relatively low ambient temperature conditions, said orifice having variable open positions between said fully open and fully closed positions in accordance with the ambient temperature.

6. A variable speed fan as set forth in claim 1 wherein the housing means comprises a housing having one end closed by removable cover means and the opposite end closed by a wall having a centrally disposed outwardly extending sleeve member provided therein for receiving the drive shaft therethrough, bearing means interposed between the drive shaft and the sleeve member for independent rotational movement therebetween, and means interposed between the sleeve means and the fan for securing the sleeve means to the fan for simultaneous rotational movement therebetween.

7. A variable speed fan as set forth in claim 6 wherein the housing includes second sleeve means provided on said wall substantially concentric with said first sleeve and extending inwardly within the housing for receiving said pump means thereon.

8. A variable speed fan as set forth in claim 6 wherein breather cap means is secured to said removable cover means.

9. A variable speed torque coupling for transmitting torque between a constant speed input means and a variable speed output means comprising housing means freely journalled on the input means for independent rotation therebetween and operably connected with the output means for simultaneous rotational movement therebetween, a fluid reservoir provided within said housing means, a pump rigidly secured to the housing means and having both the intake and discharge ports thereof in communication with the fluid reservoir for recirculating the fluid therein, variable orifice valve means interposed between the pump and the fluid reservoir for controlling the rate of fluid flow during the recirculation of the fluid, said variable orifice valve means having a substantially fully closed position for providing a fluid lock condition within the pump whereby the pump and housing are rotated about the axis of the input means for transmitting rotation to the output means, said variable orifice valve means having a substantially fully open position providing substantially free flow of the fluid during the recirculation thereof whereby substantially no rotation is transmitted to the pump and housing means for providing a substantially stopped condition for the output means, and said variable orifice valve means having varying positions between said fully open and fully closed positions for providing substantially any desired rotational speed for the output means between a minimum rotational speed of zero and a maximum rotational speed equal to the speed of the input means.

10. A variable speed torque coupling as set forth in claim 9 wherein the variable orifice valve is responsive to ambient temperature for adjusting the size of the orifice opening between said fully open and fully closed positions whereby the speed of rotation of the output means is in relation to the ambient temperature.

11. A variable speed torque coupling as set forth in claim 9 wherein the input means is a drive shaft, and the output means is a fan.

12. A variable speed torque coupling as set forth in claim 9 and including dynamic seal means interposed between the input means and the housing means for precluding leakage of fluid therebetween.

13. A variable speed torque coupling as set forth in claim 9 wherein the pump is submerged in the fluid reservoir.

* * * * *